No. 641,814. Patented Jan. 23, 1900.
J. F. WAGNER & A. FREESTON.
APPARATUS FOR MANUFACTURING ICE.
(Application filed Oct. 11, 1899.)
(No Model.)
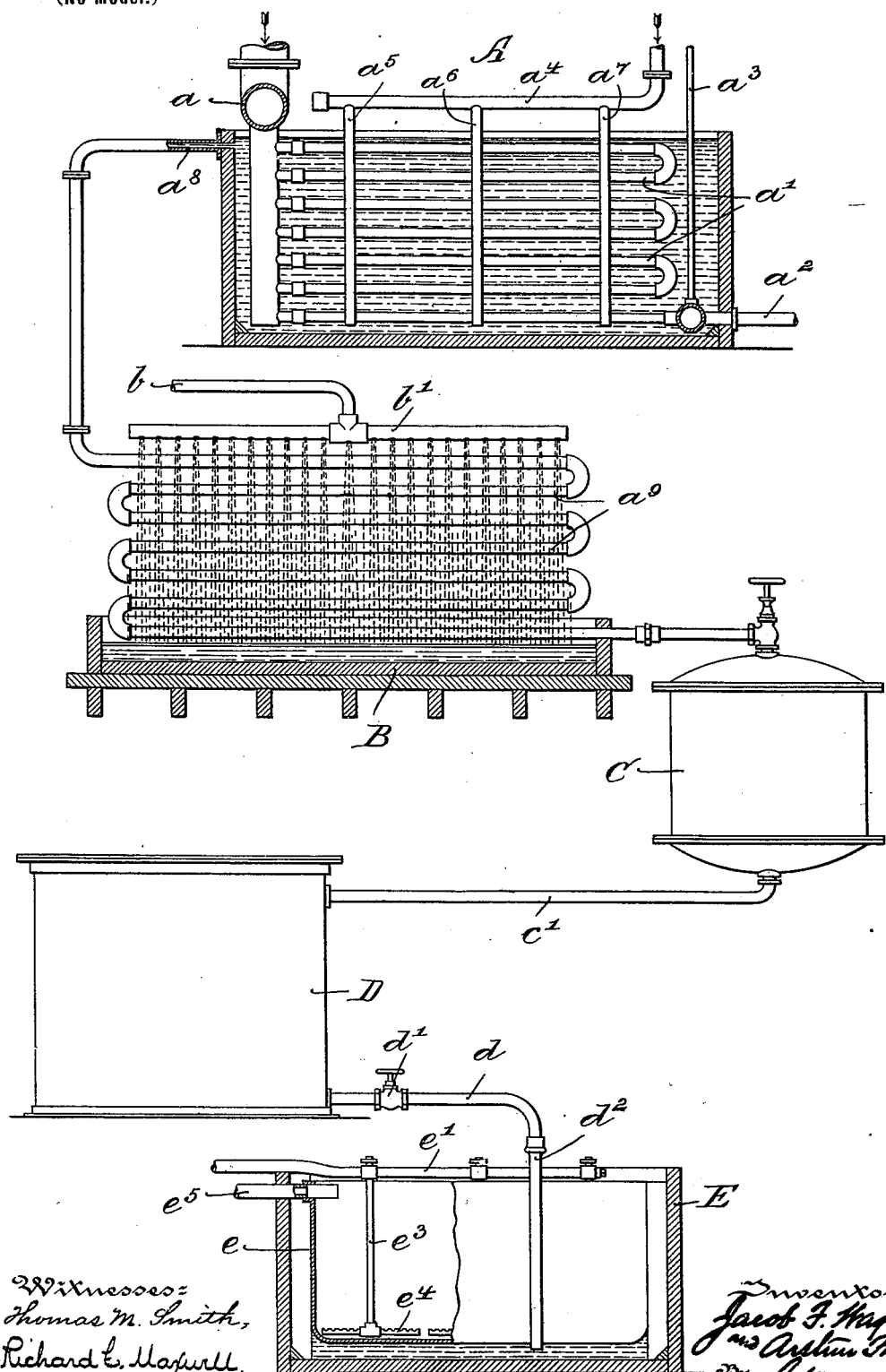

UNITED STATES PATENT OFFICE.

JACOB F. WAGNER AND ARTHUR FREESTON, OF PHILADELPHIA, PENNSYLVANIA, ASSIGNORS TO THE ICE MANUFACTURING COMPANY OF GERMANTOWN, OF SAME PLACE.

APPARATUS FOR MANUFACTURING ICE.

SPECIFICATION forming part of Letters Patent No. 641,814, dated January 23, 1900.

Application filed October 11, 1899. Serial No. 733,266. (No model.)

*To all whom it may concern:*

Be it known that we, JACOB F. WAGNER and ARTHUR FREESTON, citizens of the United States, residing at Philadelphia, (Germantown,) in the county of Philadelphia and State of Pennsylvania, have invented certain new and useful Improvements in Apparatus for the Manufacture of Ice, of which the following is a specification.

Our invention has relation to apparatus in which water is treated prior to its discharge into a freezing tank, can, or other appliance for producing ice in a pure state free from air-needles or internal honeycombed conditions. For this purpose the water to be freed from air and gases prior to discharge into a freezing appliance is conducted through the apparatus of our invention in one direction, and a heating media for heating the water is conducted through the same in an opposite direction, the coldest portion of the water being brought into contact with the coolest portion of the heating media and the hottest portion of the gradually-heated water into contact with the hottest portion of the heating media, whereby a rapid heating of the water is insured, which by beginning at the bottom of the apparatus and increasing in heat toward the top of the same avoids agitation of the water during the heating thereof. Agitation would take place if the hottest portion of the heating media was introduced into the coolest portion of the water, and which agitation, as is well known, is the cause of reabsorption of air and gases by the water. The water so treated is discharged at the upper portion of the apparatus, in which the body of water is not only the hottest, but naturally is also the purest—that is to say, freed from air and gases. The possible boiling of this hottest body of water, and thereby agitation of the same, is by the continuous discharge of the water at this point obviated. Furthermore, the flow of the water in an upward direction in the apparatus carries with it the impurities, which are removed therefrom by subsequent filtering, the less heavy impure particles being held in suspension, while the heavier impure particles of the water are discharged with the heated water into the cooling apparatus and then subjected to the filtering media for their removal. The lifting force of the current of water will hold these impurities at the top of the water, which here forms a scum distributed over the surface of the water, and the scum thus formed will readily permit of the passage of the air and gas bubbles from the water, but will prevent the outside atmosphere in contacting with the water in the apparatus to reabsorb air and gases and also maintain the apparatus free from sediment or any settling in the bottom thereof.

The nature and characteristic features of our invention will be more fully understood from the following description, taken in connection with the accompanying drawing, forming part hereof, illustrating in section and in elevation an apparatus embodying the main features of our said invention.

Referring to the drawing, A is a fluid-tank provided with an inlet-pipe $a$ to a series of heating-coils $a'$ in said tank, through which coils the steam or heated air is conveyed, circulated, and discharged through an outlet-pipe $a^2$ as condensed steam, live or exhaust.

$a^3$ is a small blow-off pipe.

$a^4$ is a water-inlet main, and $a^5$, $a^6$, and $a^7$ are branch pipes leading therefrom for discharging the water into the bottom of the tank and so as to rise without agitation therein and be discharged from the tank through the pipe $a^8$, the extension of which is preferably formed into or connected with a series of coils $a^9$.

The tank A by the circulation of steam or heated air permitted through the series of coils $a$ raises the temperature of the water rising in the tank A to about 190° Fahrenheit to insure the liberation of air and noxious gases from the water, and the water introduced into the tank A, freed from air and gases anterior to the freezing of the same, is heated gradually and without agitation to permit expeditiously of the freeing of the air and gases therefrom, and the lighter impurities float upon the upper portion of the body of heated water as a scum or supernatant fluid, while the heavier impurities are carried with the permitted liberated water freed from air and gases, and these heavier impurities are then after the cooling of the water freed therefrom by filtration. By avoiding agitation of the water in the tank A tendency to reabsorption of the air and gases by the thus-treated water is avoided.

$b$ is a water-supply main located above a cooling-tank B.

$b'$ is a union perforated pipe connection, through the perforations of which connection the water from a suitable source of supply, passing through the pipes $b$ and $b'$, by falling cools off the water in passage through the coils $a^9$. From the coils $a^9$ the water thus cooled and freed of air and noxious gases is conducted through an appliance C, containing filtering media, wherein all impurities are removed. The water is then conveyed by pipe connections $c'$ into a reservoir D, supplying in purified condition the water to the ice-forming tanks E through the pipe connection $d$, provided with a stop-cock $d'$, and hose extension $d^2$, conducting the water to the bottom of the tank E, which by rising in the same will not agitate the water. These tanks E are generally arranged in series and provided with oblong cells $e$, of the usual construction.

$e'$ is a pipe connection provided with vertical branches $e^3$, depending therefrom and terminating in a longitudinal perforated extension $e^4$, located near the bottom on the interior of each cell, through which perforations the brine or other refrigerating media is permitted to rise in the cells and exert its influence, by the chilling and freezing of the walls of the cell, to cause from both sides the freezing, progressively, of the water into oblong plates or blocks of ice toward a vertical median plane of the body of water in each tank E, maintained in a substantially quiescent state, freed of impurities, air, and noxious gases. The ice is thus formed without the body internally being honeycombed or of the formation of air-needles to become receptacles for dirt or other extraneous matter in the handling of the same, which if they existed therein would depreciate the value and usefulness, as well as quality, of the ice.

$e^5$ is an exit-pipe for the brine or ammonia from each cell of the tank E.

The water in the cells of the tank E, as hereinbefore mentioned, is allowed to remain owing to its suitability and temperature for quickly reducing in an effective manner a fresh supply of purified water to the tanks to replace the removed plates or blocks of ice, and not, as hitherto, is it discharged into a sewer. This has been a desideratum in the past and an expense which it has been highly desirable to overcome—that is, the discharge of the tempered water containing impurities liberated into the same in the formation of the ice—but practice has demonstrated that it was essential for the sale of the ice made to rid each tank after the plates or blocks of ice were formed of the contaminated lower temperatured water, and also to cleanse the tanks before supplying with fresh filtered water for another freezing operation, yet each time with the loss of a large quantity in which energy has been expended in tempering, and which if available could be used to expedite freezing of a fresh supply of water to the tank, owing to the lower temperature of such water to hasten freezing of the body of water in the tank into ice.

By our invention, as hereinbefore described, we accomplish the above in a most practical manner without the ice being honeycombed and without air-needles or gases therein. Furthermore, the ice produced is not so susceptible to melting and can be safely made in one season and used during a subsequent season.

Having thus described the nature and objects of our invention, what we claim as new, and desire to secure by Letters Patent, is—

1. An apparatus for manufacturing ice, comprising a tank, means adapted to distribute the water in a certain portion of said tank, means for conducting a heating media through the water in said tank in a direction opposite to the distribution and movement in volume of the water in said tank, means for permitting of the discharge of the water in its hottest condition in volume in said tank from the same, said tank connected with a cooling coiled tank by means of a pipe connection from said coils in said tank and having a perforated water-discharge over said coils, a filtering appliance connected with said cooling coil-tank and through a reservoir with an ice-forming tank having a cell on each side for containing brine or ammonia and an exit from said cell, substantially as and for the purposes described.

2. An apparatus for manufacturing ice, comprising an open tank having a water-outlet at its upper end, a series of steam-coils having an inlet arranged near the water-outlet of said tank, a steam-outlet near the base thereof, a water-inlet pipe having branches traversing the tank and terminating at the bottom thereof, said tank connected with a cooling-tank by pipe connections formed into coils in said tank and having a water-discharge, a filtering appliance connected with said cooling-tank and with ice-forming tanks having cells for containing brine or ammonia for congealing the treated fluid within said tanks and an exit from said cells, substantially as and for the purposes described.

In testimony whereof we have hereunto set our signatures in the presence of two subscribing witnesses.

JACOB F. WAGNER.
ARTHUR FREESTON.

Witnesses:
VICTOR PAUL,
J. WALTER DOUGLASS.